V. B. JORDAN.
MILKING MACHINE.
APPLICATION FILED JUNE 21, 1915.
1,185,203.
Patented May 30, 1916.
2 SHEETS—SHEET 2.
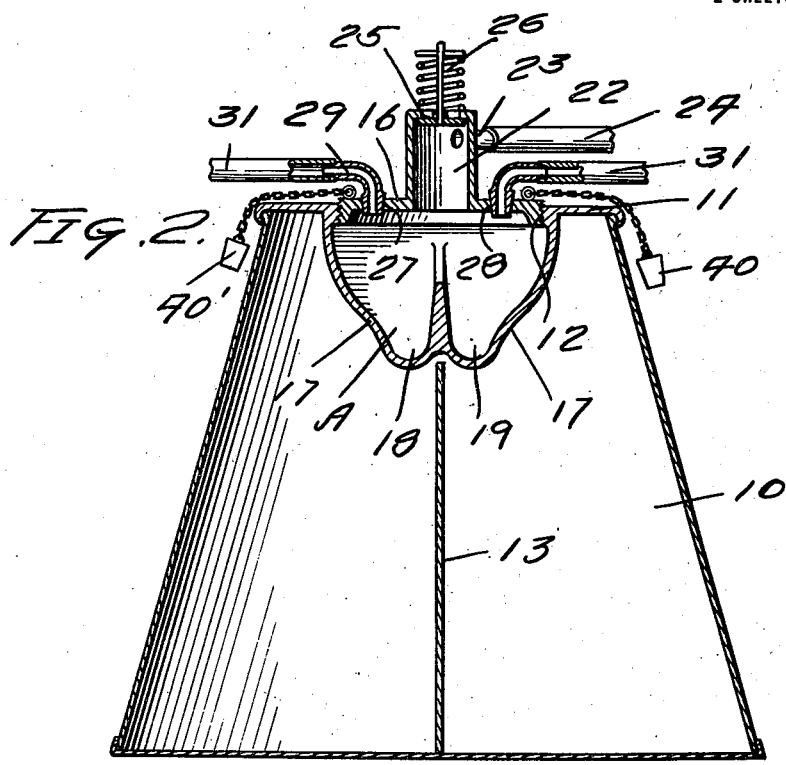
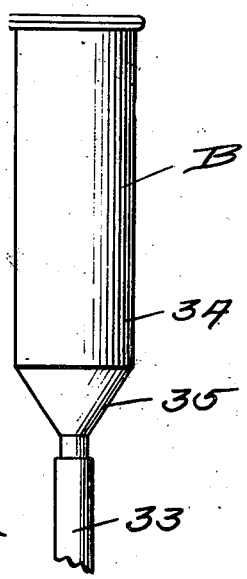
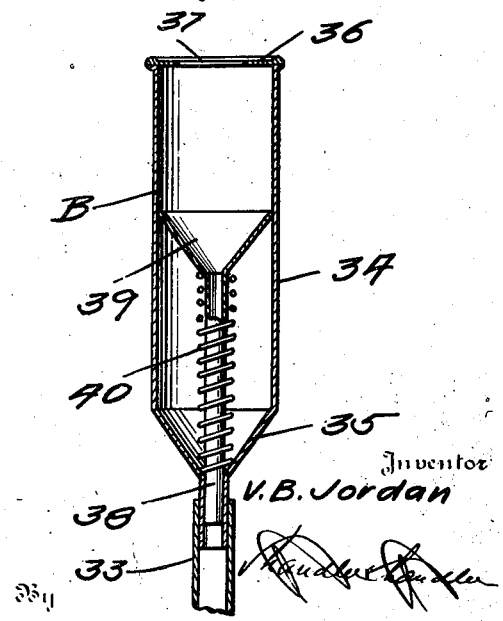
Inventor
V. B. Jordan

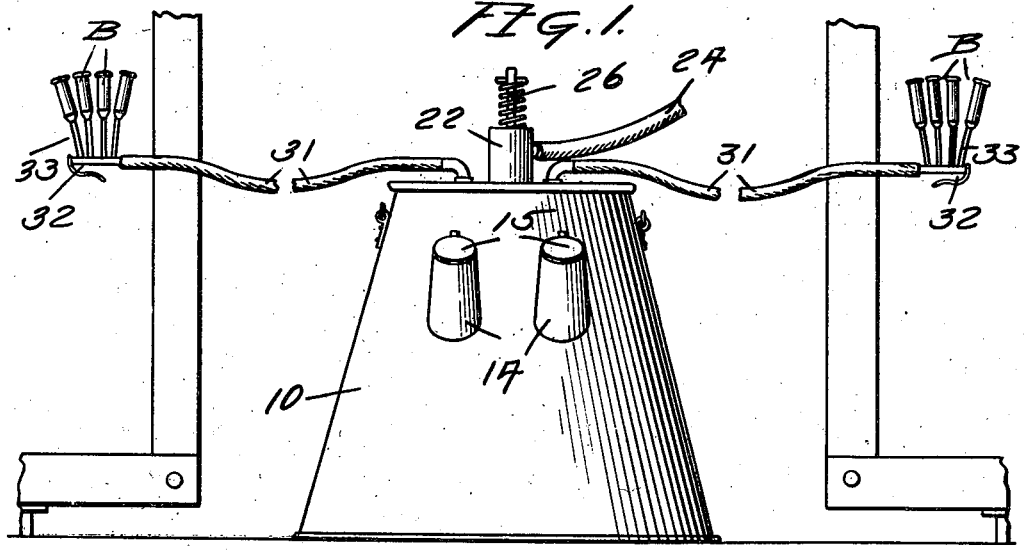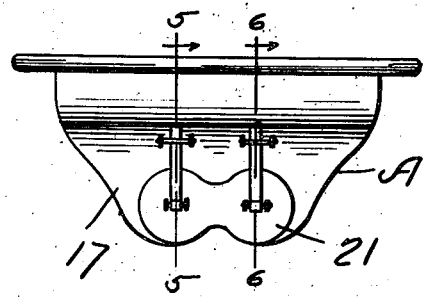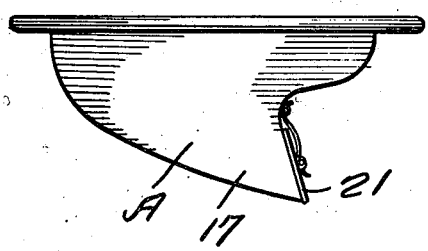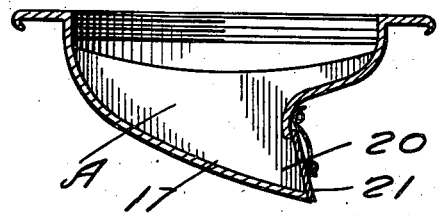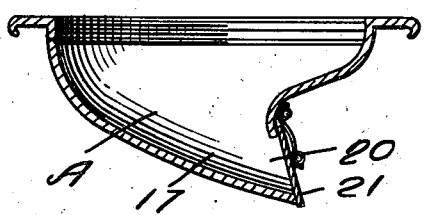

UNITED STATES PATENT OFFICE.

VICTOR B. JORDAN, OF WATERVILLE, MAINE.

MILKING-MACHINE.

1,185,203. Specification of Letters Patent. Patented May 30, 1916.

Application filed June 21, 1915. Serial No. 35,352.

*To all whom it may concern:*

Be it known that I, VICTOR B. JORDAN, a citizen of the United States, residing at Waterville, in the county of Kennebec, State of Maine, have invented certain new and useful Improvements in Milking-Machines; and I do hereby declare the following to be a full, clear, and exact description of the invention, such as will enable others skilled in the art to which it appertains, to make and use the same.

This invention relates to milking machines.

The object of the invention resides in the provision of a milking machine embodying an improved construction the operation of which will closely simulate hand milking and therefore avoid those injuries usually resulting from the use of mechanically operated milking devices.

A further object of the invention resides in the provision of an improved teat cup adapted to automatically adjust itself during operation.

A still further object of the invention resides in the provision of mechanism for efficiently controlling the vacuum in the vacuum chamber.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which Figure 1 is a view of a milking machine constructed in accordance with the invention as assembled for operation, the vacuum pump not being shown; Fig. 2, a vertical section through the pail and vacuum chamber, which latter constitutes the upper end of the pail; Fig. 3, a front view of the vacuum chamber with its top removed; Fig. 4, a side view of the vacuum chamber; Fig. 5, a section on the line 5—5 of Fig. 3; Fig. 6, a section on the line 6—6 of Fig. 3; Fig. 7, a view in elevation of one of the teat cups employed in the machine, and Fig. 8 a vertical section of what is shown in Fig. 7.

The machine illustrated herein is of the dual type or in other words is designed to effect the simultaneous milking of two cows.

The invention is shown as comprising a pail 10 including a top 11 having a threaded opening 12. The pail 10 also has provided therein a vertical partition 13 the upper end of which is spaced a considerable distance from the top 11. Projecting from the pail 10 on either side of the partition 13 is a spout 14 and each spout is normally closed at its outer end by a gravity closure 15.

The vacuum chamber is indicated generally at A and includes a top 16 which is threaded in the opening 12 and a bottom 17 which is integrally jointed with the pail around said opening. This bottom 17 is provided with dished portions 18 and 19 disposed respectively on opposite sides of the partition 13. These dished portions 18 and 19 are inclined and terminate at corresponding ends in discharge openings 20 which are normally closed by a gravity shutter 21. The top 16 is provided with a hollow upward extension 22 which carries a pipe section 23 opening through its side wall and adapted to be connected through the medium of a hose 24 with a suitable vacuum pump. The upper end of the extension 22 is provided with an opening 25 which is normally closed through the medium of a pressure gage 26; this pressure gage serves to control the vacuum in the chamber A during the operation of milking. Detachably engaged in openings 27 and 28 in the top 16 are L-shaped pipe sections 29 and 30 respectively. These openings 27 and 28 are disposed outwardly of the dished portions 18 and 29 respectively so that milk delivered into the chamber A through the pipe section 29 will pass into the dished portion 18 while milk delivered into the chamber A through the pipe 30 will pass into the dished portion 19. Leading from the outer ends of the pipe sections 29 and 30 are flexible hose 31 the free ends of which are attached to teat cup heads 32 respectively. Extending laterally from each head 32 are tubular pipe sections 33 and the outer ends of these sections are operatively connected respectively with teat cups B.

Each of the cups B comprises a tubular member 34 having one end contracted as at 35 and its other end partially closed by a disk 36 having a central opening 37. Slidably engaged through the contracted end 35 is a tube 38 the outer end of which is secured to a receptive pipe section 33 while the inner end thereof is flared as at 39. Encircling the tube 38 is a spring 40 one end of which bears against the member 34 while the other end bears against the flared portion 39 and serves to automatically adjust the tube 38 and the flared end 39 to meet the particular conditions being encountered. If it is desired to milk only one cow either the pipe section 29 or the pipe section 30 is removed and the opening in which it was engaged it closed by a stopper 40'.

It will be noted that by providing the partition 13 and disposing the dished portions 18 and 19 and the spouts 14 on either side of the partition 13 the milk of respective cows is maintained separate.

In operation a vacuum in the chamber A is formed with each vacuum stroke of the pump and this vacuum is transmitted to the cups B and the desired milking effect produced. When a vacuum is present in the chamber A the shutters 21 will be held tightly closed and as soon as the vacuum is relieved by the opposite stroke of the pump the weight of the milk in the dished portions 18 and 19 will force the shutter 21 open and the milk will pass out of the chamber A on either side of the partition 13 into the pail.

What is claimed is:

In a milking machine the combination of a milk chamber, a partition in said milk chamber, a vacuum chamber within the milk chamber including independent troughs adapted to discharge through openings on either side of the partition, and a gravity shutter normally closing the discharge openings of the troughs.

In testimony whereof, I affix my signature, in the presence of two witnesses.

VICTOR B. JORDAN.

Witnesses:
  G. L. CLARKE,
  GEO. JELLISON.